United States Patent
Xiang et al.

(10) Patent No.: US 8,654,796 B2
(45) Date of Patent: Feb. 18, 2014

(54) SYSTEM FOR SYNCHRONIZING CLOCK

(75) Inventors: Jiying Xiang, Guangdong Province (CN); Zongan Li, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 501 days.

(21) Appl. No.: 12/872,138

(22) Filed: Aug. 31, 2010

(65) Prior Publication Data

US 2010/0329404 A1 Dec. 30, 2010

Related U.S. Application Data

(63) Continuation of application No. PCT/CN2008/072095, filed on Aug. 21, 2008.

(30) Foreign Application Priority Data

Mar. 3, 2008 (CN) .......................... 2008 1 0083109
Apr. 3, 2008 (CN) .......................... 2008 1 0089851

(51) Int. Cl.
*H04J 3/06* (2006.01)
*H04J 3/12* (2006.01)
*H04L 7/00* (2006.01)

(52) U.S. Cl.
USPC ............................ 370/503; 370/522; 375/355

(58) Field of Classification Search
None
See application file for complete search history.

(56) References Cited

U.S. PATENT DOCUMENTS

| 8,107,579 | B2 * | 1/2012 | Obermeyer | ................... 375/373 |
| 8,165,168 | B2 * | 4/2012 | Lusky et al. | ................... 370/503 |
| 2003/0231008 | A1 * | 12/2003 | Wu | ................... 323/217 |
| 2006/0056420 | A1 * | 3/2006 | Okuda et al. | ............. 370/395.54 |
| 2007/0202827 | A1 * | 8/2007 | Lee et al. | ....................... 455/230 |

FOREIGN PATENT DOCUMENTS

| CN | 1247437 A | 3/2000 |
| CN | 1728600 A | 2/2006 |
| WO | 2007124995 A1 | 11/2007 |

OTHER PUBLICATIONS

P.R. China, State Intellectual Property Office, International Search Report for International Application No. PCT/CN2008/072095, mailed Dec. 11, 2008.

* cited by examiner

*Primary Examiner* — Xavier S. Wong
(74) *Attorney, Agent, or Firm* — Bright IP Law Offices

(57) ABSTRACT

A system for synchronizing clock, which is used to realize the synchronization between a radio frequency module and a base band module in a base station, comprises: one or more time generators, located on the radio frequency module side, configured to generate a synchronous signal according to an external clock signal, and to send the synchronous signal to a time distributor; the time distributor, located on the base band module side, configured to generate a synchronous clock according to a synchronous signal from one of the one or more time generators, and to adjust the synchronous clock according to a communication delay between the time generator which outputs the synchronous signal and the time distributor, and to send the synchronous clock adjusted to the radio frequency module and the base band module to realize the synchronization between the radio frequency module and the base band module.

20 Claims, 9 Drawing Sheets

| Attribute (Attribute) | Period (Period) | Source node address (Source Address) | Synchronization message body (Sync Identification) | Time stamp (ToD / Time stamp) | Reserved (Reserved) |
|---|---|---|---|---|---|

SYSTEM FOR SYNCHRONIZING CLOCK

This is a continuation of International Application PCT/CN2008/072095, with an International Filing Date of Aug. 21, 2008, which claims priority to Chinese Application No. 200810089851.2, filed Mar. 4, 2008 and Chinese Application No. 200810083109.0, filed Mar. 3, 2008, each of which is incorporated by reference.

FIELD OF THE INVENTION

The present invention relates to the communication field, in particular to a system for Synchronizing Clock.

BACKGROUND OF THE INVENTION

A wireless base station may be divided into two parts in view of function: a radio equipment control (REC) part which can also be called a base band (BB) part and a radio equipment (RE) part which can also be called a radio frequency module (RFM) part. The above base band part and the radio frequency module part may also be called a BBU and an RRU respectively, which essentially refer to the two parts of the base band digital part and the radio frequency part. The above base band part and the radio frequency module part are represented as REC/BB and RE/RFM hereinafter, respectively.

One REC/BB may correspond to a plurality of RE/RFMs. Regarding the physical position, the REC/BB and the RE/RFM may be set together, and may also be set separately. A standard or nonstandard interface mode is used between the REC/BB and the RE/RFM. The common public radio interface (CPRI) and the open base station architecture initiative (OBSAI) interface are typical standard interfaces. The base band radio frequency interface is generally called as BR (base band and radio frequency) interface hereinafter, which may be the CPRI and the OBSAI, and may also be a self-defined protocol interface.

The wireless base station often requires synchronization in the whole network, i.e., the REC/BB synchronizes with all of the RE/RFMs, while in the prior art, the method for solving the synchronization in the whole network is to set a time distributor on the REC/BB side, and then the clock is distributed to all of the RE/RFMs through the time distributor on the REC/BB side, as shown in FIG. 1.

FIG. 2 is a diagram of the network architecture of the conventional CPRI. As can be seen from FIG. 2, the clock source is located at the REC, the clock is transmitted on the CPRI interface through the message fields such as Z.0.0 (start of hyper-frame, K28.5), Z.64.0 (hyper-frame number), and Z.128.0/Z.192.0 (NodeB frame number), and the RE receives these messages from the CPRI interface and keeps the synchronization in the whole network using these messages.

FIG. 3 is a diagram of the network architecture of the conventional OBSAI. As can be seen from FIG. 3, in the BB module there is a control & clock module (called Con. & Clock for short in the figure) which is responsible for generating a reference clock, and then the synchronous signal is transmitted to the RFM through an RP3 interface by using the fields or the messages such as K28.7, frame clock burst, system frame time (SFN), and time stamp. Then, the RFM keeps the synchronization with other network elements according to the synchronization information obtained.

The above technical scheme that the clock source is located at the REC/BB and distributed to the RE/RFM by the base band radio frequency interface has the following problems: part of the time receivers (for example GPS) depends on antennas, while the position at which the REC/BB is set is often not suitable for arranging an antenna. Therefore, the antenna shall be connected to the REC/BB from a position which is suitable for arranging the antenna, which brings out complexity in the engineering aspect and even can lead the network construction to be infeasible.

An improved technology is to set the time receiver (for example GPS) at the outside of the base band, and then the clock synchronous signals are transmitted to the base band through a dedicated cable. The defect of this improved technology lies in that a cable for transmitting the clock/synchronous signals still needs to be added, which indeed can bring inconvenience for the engineering just the same as by adding the receiving antenna, meanwhile, if this technology is used, circuits such as lightening-proof need to be added at the base band part correspondingly, and the reliability of the long distance transmission is also a problem.

It can be seen that all the above-mentioned technologies have the problems such as difficulty in engineering installation, high cost, and low reliability.

SUMMARY OF THE INVENTION

In view of the one or more problems mentioned above, the present invention aims at providing a system for synchronizing clock to realize the synchronization between the radio frequency side and the base band side of the base station under the circumstance that no antenna is relied on and no dedicated cable is added.

The system for synchronizing clock according to the present invention, which is used to realize the synchronization between a radio frequency module and a base band module in a base station, comprises: one or more time generators, located on the radio frequency module side, configured to generate a synchronous signal according to an external clock signal, and to send the synchronous signal to a time distributor; and the time distributor, located on the base band module side, configured to generate a synchronous clock according to a synchronous signal from one of the one or more time generators, and to adjust the synchronous clock according to a communication delay between the time generator which outputs the synchronous signal and the time distributor, and to send the synchronous clock adjusted to the radio frequency side and the base band side to realize the synchronization between the radio frequency module and the base band module.

Wherein the time generator comprises: a clock receiving unit, configured to receive the external clock signal, and to send the clock signal to a synchronization generating unit; the synchronization generating unit, configured to generate the synchronous signal according to the clock signal, and to send the synchronous signal to the base band radio frequency interface of the time generator.

Wherein the time generator further comprises: a protocol terminating unit, configured to set a base band radio frequency interface protocol between the time generator and the time distributor.

Wherein the time distributor comprises: an arbitrating unit, configured to generate a selecting rule for selecting the synchronous signal from one of the time generators; a generator selecting unit, configured to select the synchronous signal for generating the synchronous clock from the synchronous signals received according to the selecting rule generated by the arbitrating unit; a clock locking unit, configured to obtain the synchronous signal selected by the generator selecting unit, to generate the synchronous clock according to the synchronous signal obtained, and to adjust the synchronous clock according to the communication delay between the time generator which outputs the synchronous signal and the time distributor; and a clock driving unit, configured to obtain the synchronous clock adjusted by the clock locking unit, and to send the synchronous clock adjusted to the radio frequency module and the base band module.

Wherein the generator selecting unit comprises: a synchronization quality detecting unit, configured to detect one or more synchronous signals of which the quality meets requirements from the synchronous signals from the time generators; a synchronous signal storing unit, configured to store the one or more synchronous signals detected by the synchronization quality detecting unit. Under the circumstance that the current synchronous signal are unusable, the generator selecting unit selects one synchronous signal from the synchronous signal storing unit and send it to the time distributor.

Wherein the time generator is further configured to measure the communication delay between the time generator and the time distributor and to notify the communication delay between the time generator and the time distributor to the time distributor. The time distributor is further configured to inquire a delay calculator the communication delay between the time generator which outputs the synchronous signal and the time distributor according to a source address of the synchronous signal received.

Wherein the time generator is an independent network element or a subsidiary network element inside the base band module of the base station. A network topology relationship among the time generators is a star shape, a link shape, a ring shape, or a tree shape. The time distributor is in a free-vibrating state under the circumstance that the time distributor is just powered on.

Through the present invention, the synchronization between the radio frequency side and the base band side in the base station can be realized under the circumstance that no antenna is relied on and no dedicated cable is added.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention, wherein.

DETAILED DESCRIPTION OF EMBODIMENTS

Figure 1:
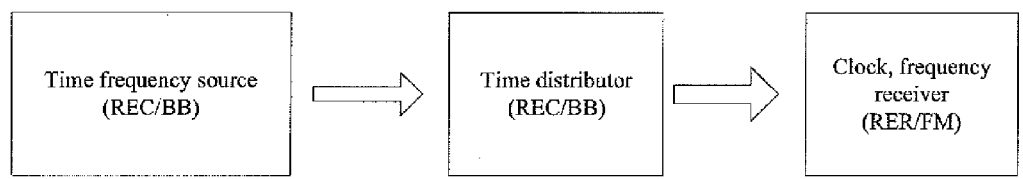
FIG. 1 is a diagram of a system for synchronizing clock in the conventional base station.
Figure 2:
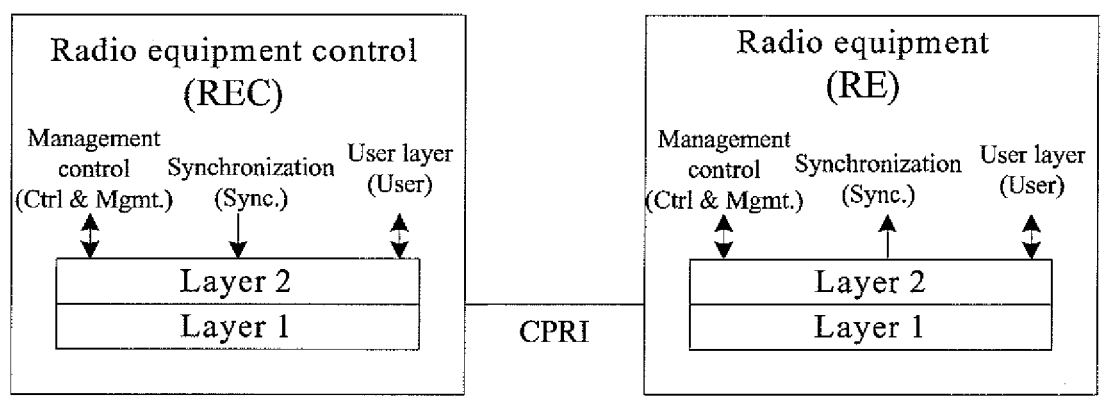
FIG. 2 is a diagram of the network architecture of the conventional CPRI.
Figure 3:
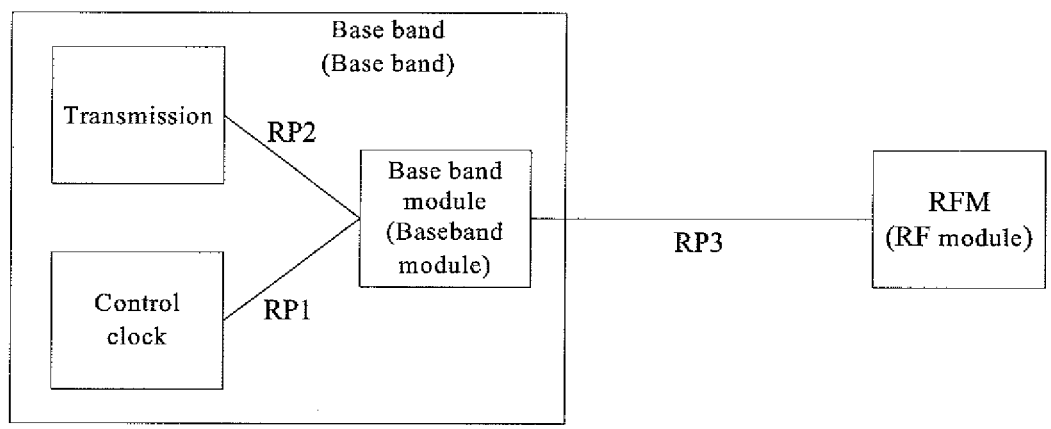
FIG. 3 is a diagram of the network architecture of the conventional OBSAI.

The system for realizing the synchronization between a radio frequency side and a base band side in the base station according to the embodiments of the present invention comprises: one or more time generators located on the radio frequency (RE/RPM) side, and a time distributor located on the base band (REC/BB) side.

Wherein the time generator may be an independent network element, and also may be located inside the RE/RFM. The time distributor and the time generators communicate with each other through an existed base band radio frequency interface without adding any dedicated transmission line. The time distributor may communicate with one or more radio frequency links, and each radio frequency link may have one or more time generators. Wherein the network topology relationship among the time generators is a star shape/a link shape/a ring shape/a tree shape.

Wherein the time generator mainly comprises a time receiver (i.e., a time receiving unit), a synchronization generator (Sync generator, i.e., a synchronization generating unit), and a base band radio frequency interference terminator (BR protocol terminer, i.e., a protocol terminating unit).

Wherein the time receiver receives the clock signal and transmits it to the synchronization generator. The synchronization generator generates the synchronous signal according to the clock signal, and inserts the synchronous signal generated into the base band radio frequency interface. Wherein the time receiver transmits transparently the data flow signal to the next level. The synchronous signal flow (Sync flow) generated by the synchronization generator may have a plurality of attributes which can label the source address, and can label the time stamp.

Wherein the time distributor mainly comprises an active time generator selector (time generator selector, i.e., a generator selecting unit), an arbiter (i.e., an arbitrating unit), a clock locker (i.e., a clock locking unit), and a clock driver (i.e., a clock driving unit).

Wherein inside the active time generator selector, it comprises a plurality of synchronization quality detectors (Quality inspector, i.e., a synchronization quality detecting unit), it also comprises a candidate synchronization flow pool (candidate pool, i.e., a synchronization signal storing unit).

Wherein the synchronization quality detector detects a plurality of synchronization flows from a plurality of links, and sends the synchronization flows which met the quality requirements after being detected to the synchronization flow pool (the state of the synchronization flow can be "normal", "abnormal" or "usable but on hold state" and so on, the synchronization flow which meets the quality requirements herein refers to the synchronization flow in the normal state.). The active time generator selector performs the selection from a plurality of synchronization flows according to the selecting rule generated by the arbitrator, and only selects one synchronization flow at a certain time.

Wherein the clock locker generates the synchronization clock according to the synchronization flow selected, adjusts the synchronization clock according to the delay, and sends the synchronization clock to the clock driver after the synchronization clock is adjusted, and then the clock driver sends the synchronization clock to the base band and radio frequency unit.

Wherein the time generator needs to be able to measure the transmission delay between the base bands REC/BB, or the active time generator selector needs to be able to inquire the delay of the source node from the delay calculator according to the source address of the synchronization signal to ensure that the clock locker may adjust the synchronization signal according to this delay.

Wherein when the current synchronization flow is unusable, the active time generator selector automatically selects another synchronization flow from the candidate flows. When the time distributor is powered on, it is in the free-vibrating state, and when the first normal sync flow is detected and locked, at the same time the delay data is correctly obtained, the time distributor normally outputs and inserts the active synchronization flow to the BR interface. RE/RFM synchronizes the signal according to the active synchronization flow (active sync flow).

The embodiments of the present invention will be described hereinafter in detail in conjunction with the drawings thereof.

Figure 4:
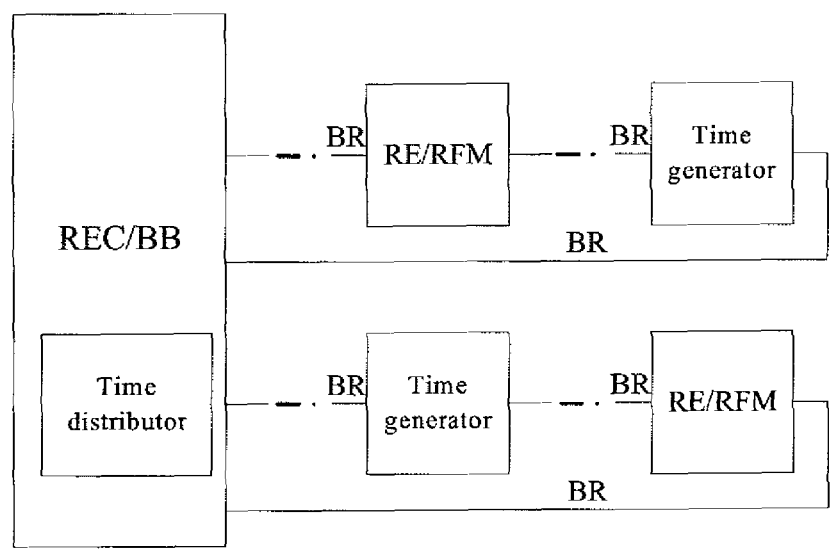
FIG. 4 is a diagram of the network architecture of a system for synchronizing clock in the base station according to an embodiment of the present invention (the time generator is independent)
Figure 5:
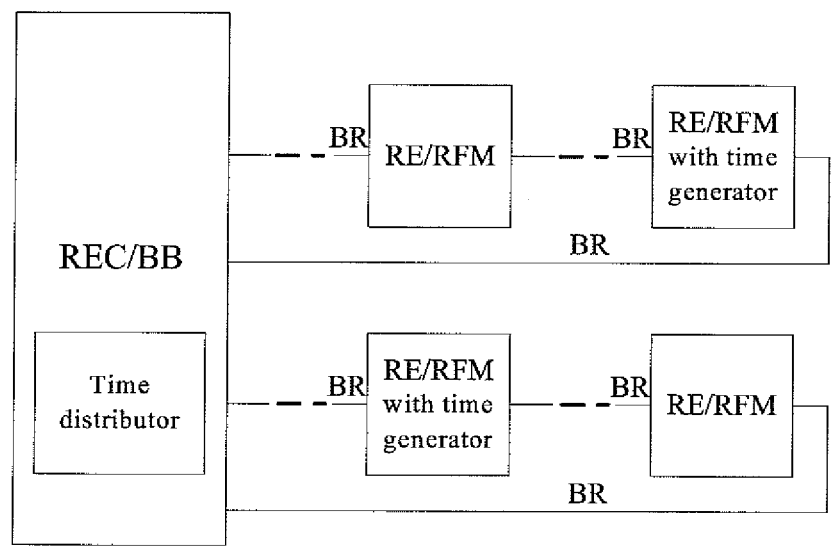
FIG. 5 is a diagram of the network architecture of a system for synchronizing clock in the base station according to an embodiment of the present invention (the time generator is located in the RE/RFM)

FIG. 4 and FIG. 5 are diagrams of the network architecture of a system for synchronizing clock according to the embodiments of the present invention. As can be seen from these figures, the time generator is not located in the REC/BB anymore, but is located on the link from the base band to the radio frequency. Wherein the time generator in FIG. 4 is an independent component, while the time generator in FIG. 5 is set in the radio frequency unit RE/RFM.

The BR in FIG. 4 and FIG. 5 is an interface from the base band to the radio frequency. The BR interface may be an enhanced CPRI interface (which is improved and supports the time generator), may also be an enhanced OBSAI RP3 interface (which is improved and supports the time generator), and may also be a self-defined base band/radio frequency interface. The BR interface may be connected to a plurality of components, and the topology relationship between each component may be a star shape/a link shape/a ring shape/a tree shape. The interfaces of the time generator to other components are BR interfaces, and in the whole network there may be not only one time generator, even on the same BR link (or ring) there may be more than one time generators. The time distributor is still located on the REC/BB in order to manage uniformly the clocks output from a plurality of time generators.

Figure 6:
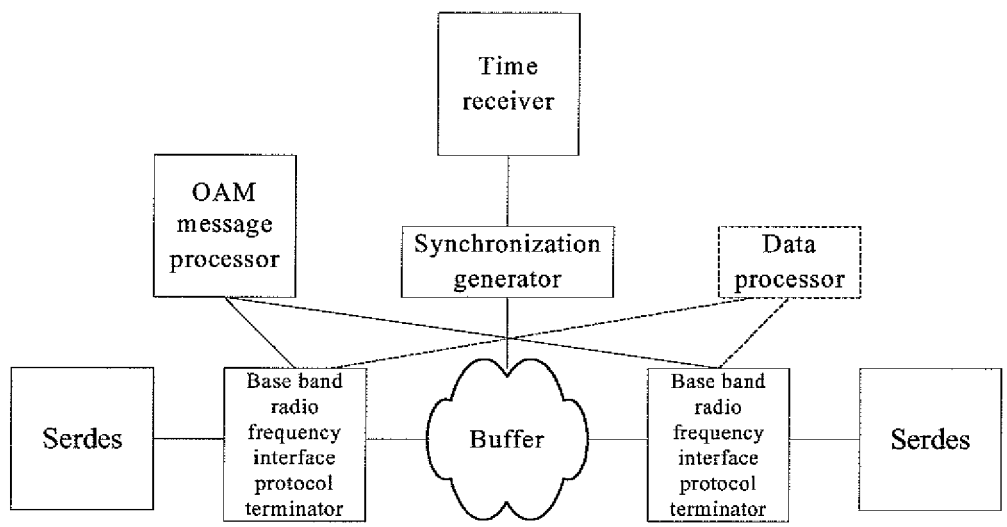
FIG. 6 is a function block diagram of the time generator according to an embodiment of the present invention.

FIG. 6 is a function block diagram of the time generator according to an embodiment of the present invention. As shown in FIG. 6, the working principle of this time generator is: a serdes (serializer/desarializer) and a BR protocol terminator terminate the physical layer of the BR interface and the layer 2/layer 3 protocols, and transmits the data obtained to a buffer. The time receiver receives the clock signal, and after determining that the clock received is stable and reliable, the synchronous signal is generated. The time receiver may be a GPS receiver, or an IEEE1588 terminal, or the time receivers of other forms. The synchronous signal generated by the time generator is sent to the sync generator. If the time generator is not imbedded in an RE/RFM, the data flow input by the BR interface of the upper level is transmitted transparently to the next level without being processed. Otherwise, the data flow is processed and transmitted according to the requirements of RE/RFM.

Figures 7, 8:
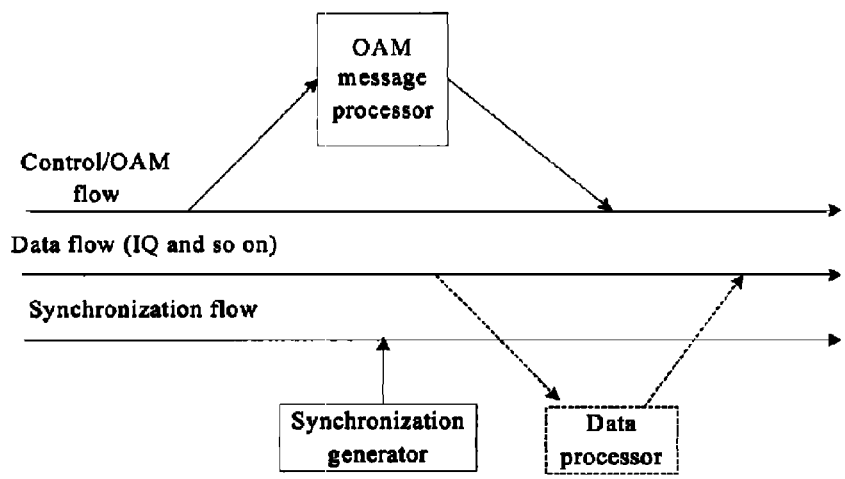
FIG. 7 is a schematic view of the data processing procedure of the time generator according to an embodiment of the present invention.
FIG. 8 is a schematic view of the format of the synchronous signal flow according to an embodiment of the present invention.

FIG. 7 is a schematic view of the data processing procedure of the time generator according to an embodiment of the present invention. As shown in FIG. 7, the control/OAM (operation/administration and maintenance) flow input by the BR interface of the upper level is determined whether it belongs to the time generator, if the flow belongs to the time generator, the flow will be forwarded to an operation and maintenance message processor (OAM message processor) to be processed; otherwise the flow will be transmitted transparently to the next level. The synchronization generator generates the synchronization information flow (sync flow) according to the requirements of the BR interface protocol, and inserts it into the BR interface. The sync flow from the upper level is transmitted transparently to the next level.

Wherein the sync flow is one kind of message transmitted between the REC/BB and the RE/RFM or the time generator, it is multiplexed into the base band radio frequency interface BR together with other messages and data. FIG. 8 gives an example of a possible format of the synchronization flow. The following fields are comprised in the example:

Attribute: labeling the attribute of the message which may be an active state or a passive state, wherein the unmodified message is in the passive state, otherwise, the massage is in the active state. The message with the active state must be sent by the REC/BB.

Period: labeling the period of the message, such as once a second, or once each 10 ms.

Source address: labeling the source node address of the time generator which generated the sync flow, if the time generator is embedded in the RE/RFM, it is the same as the address of the RE/RFM.

Sync identification: synchronization message body.

ToD/time stamp: time of day or time stamp, for labeling a long period.

Reserved: reserved

Since in a same network there may be a plurality of time sources, the sync generator needs to mark its identification (source address) in the synchronization information flow. This address (for example, RFS_ID) may be obtained from the system when the system is powered on according to the same rule with that of the RE/RFM network.

The same as the normal RE/RFM, the time generator needs to participate and cooperate in the measurement of the system delay. The time distributor is located on the REC/BB side, the reason that the time distributor is located on the REC/BB side but not at the RE/RFM side is that only the REC/BB can exclusively select the active clock from a plurality of clock sources.

Figure 9:
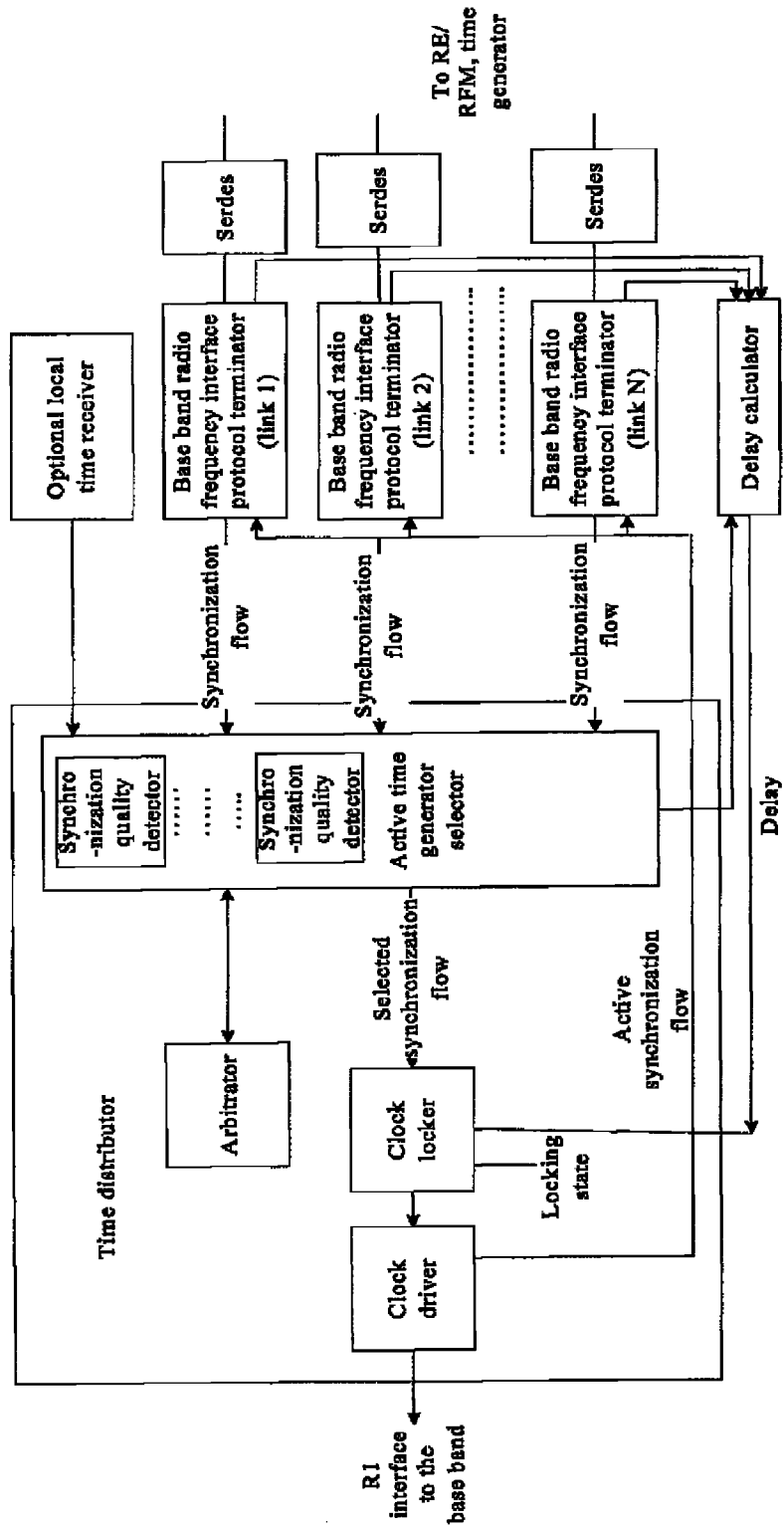
FIG. 9 is a logic block diagram of the clock distributor according to an embodiment of the present invention.

FIG. 9 is a logic diagram of the time generator according to the embodiments of the present invention. As shown in FIG. 9, the time distributor comprises an active time generator selector, an arbitrator, a time generator and a clock driver.

In the same system, the sync flow may be from several sources, even in the same radio frequency link there may be a plurality of clock sources which work simultaneously, and therefore the time distributor needs to select one clock source from a plurality of clock sources as an active synchronization flow (selected sync).

Firstly, a plurality of BR protocol terminators terminates the BR protocol, parses and obtains the sync flow signals thereof and sends the signals to the time generator selector to be selected. Wherein each radio frequency link may be parsed to obtain zero, one, or a plurality of synchronization flows according to the actual arrangement situation of the time generator. Except for the synchronization flow from the BR interface, one or more local time receivers is/are allowed, and the synchronization signal obtained by the local time receiver is treated the same as the synchronization signal of the BR interface.

Figure 10:
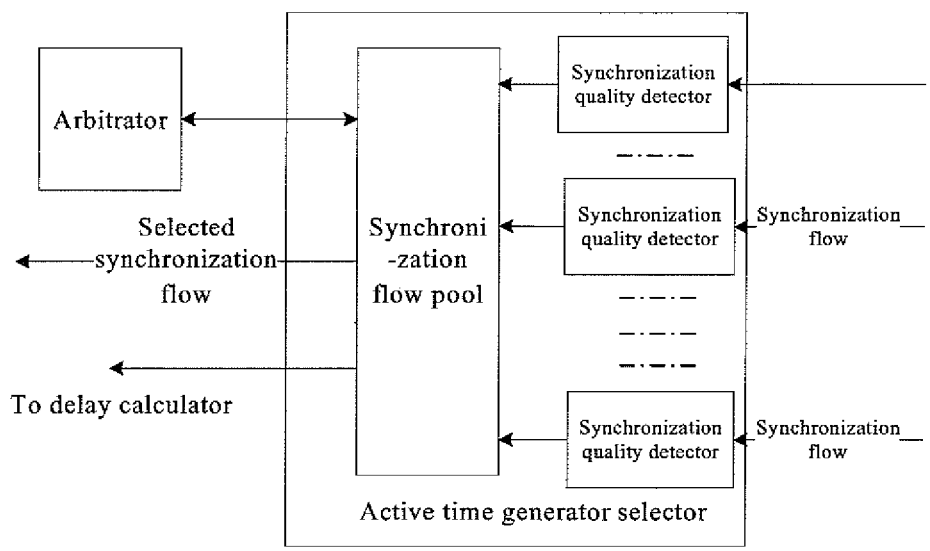
FIG. 10 is a logic block diagram of the time generator selector according to an embodiment of the present invention.

FIG. 10 is a logic diagram of the time generator selector according to an embodiment of the present invention. As shown in FIG. 10, inside the time generator selector it comprises a plurality of synchronization quality detectors and a candidate synchronous signal pool.

The input sync flow is firstly sent to the synchronization quality detector, and the synchronization quality detector detects each synchronization flows which are labeled as "passive" (the synchronization flows which are labeled as active do not need to be processed), and the normal synchronization flows thereof are sent to the candidate pool (candidate synchronous signal pool), and the abnormal synchronization flows are discarded. Herein, the "clock quality" may have not only the two states of "normal" and "abnormal", but may also have other states, for example, "the state of usable but hold" and so on.

An active synchronous signal (selected sync flow) is uniquely selected from the signals entered the candidate synchronous signal pool according to the rule predetermined by the arbitrator.

Wherein the selecting rules generated by the arbitrator may be selecting the normal synchronization flow with the smallest sequence number in the link with the smallest sequence number, may also be selecting the synchronization flow with the smallest delay, may also use the principle that the local is of a higher priority.

The selected sync flow output by the time generator selector enters the clock locker, and it generates various clocks needed by the system according to the synchronous signal. The clock locker may be composed of a plurality of phase-locked loops (PLL).

The clocks generated by the clock locker are sent to the clock driver, and are distributed to each component which need the synchronization clock in the system, for example, the base band radio frequency interface (BR) unit, the base band modem unit and so on.

As can be seen from the network structure diagram in FIG. 4 or FIG. 5, the clocks received by the time generator may need a long distance transmission before arriving at the REC/BB, therefore these clocks have had the deviation before arriving at the distribution points.

The transmission time of the signal in the link can be measured on the BR interface, and each node on the BR interface may calculate the delay to the REC/BB. For the same reason, the time generator hang on the BR interface can also calculate the delay to the REC/BB, and this delay data is notified to the REC/BB through a message.

After receiving the synchronization flow selected, the time generator selector sends a request to the delay calculator according to the source address of the synchronization signal. The delay calculator checks the delay of the node corresponding to the source address, and sends the delay to the clock locker. The latter modifies the output overall synchronization signals according to the number of the delay (for example, notifying the base band modem unit to emit in advance, notifying the base band modem unit to modify the search scope, and notifying the RE/RFM to modify the reference time and so on).

As described above, the arbitrator selects the active synchronization flow according to a certain rule. When the selected sync flow is not usable, the system can automatically select another sync flow from the candidate pool, and synchronizes with the new sync flow. After the sync flow is switched, the clock locker needs to modify the synchronization signal according to the new value of the delay.

When the candidate pool is empty, it indicates that any normal sync flow is not usable, at this time, the alarm needs to be reported, and the clock locker enters to a free-vibrating state, correspondingly, each node on the BR interface also vibrates along with the REC/BB. The data transmission among each node is still normal, but the synchronization in the whole network can not be maintained.

At the moment of powering on, in order to maintain the normal work, the candidate pool needs to be cleaned up, and at this time, the clock locker is in a free-vibrating state, each node on the BR interface also vibrates along with the REC/BB. When the first normal sync flow is detected, the time generator selector immediately outputs this signal and sends it to the clock locker, the clock locker tries to lock this signal, after the locking is successful, and the delay of the source node is successfully obtained, a locking indication is given, and the modified synchronous message is inserted into the BR interface. The synchronous message inserted into the BR is labeled as "active".

When any one of the following three conditions is not satisfied, the clock locker does not output the active sync flow: the input selected sync flow must be effective; the clock locker must be locked, the delay corresponding to the selected sync flow must be normal.

After receiving the sync flow, the RE/RFM firstly makes a judgment: one kind of sync flow may come from the clock locker of the upper level, and this kind of sync flow is not calibrated by the REC/BB, and the attribute thereof is labeled as passive, the REC/BB only transmits this kind of synchronization signal to the next level transparently without processing; another kind of sync flow is sent out after being calibrated by the time distributor of the REC/BB, and the attribute of this kind of sync flow is labeled as active. In the same time period there is only one active sync flow. The REC/BB calibrates its own clock according to this active sync flow to ensure that it synchronizes with the REC/BB and other RE/RFMs.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A system for synchronizing clock, which is used to realize the synchronization between a radio frequency module and a base band module in a base station, comprising:
   one or more time generators, located on the radio frequency module side, configured to generate a synchronous signal according to an external clock signal, and to send the synchronous signal to a time distributor; and
   the time distributor, located on the base band module side, configured to generate a synchronous clock according to a synchronous signal from one of the one or more time generators, and to adjust the synchronous clock according to a communication delay between the time generator which outputs the synchronous signal and the time distributor, and to send the synchronous clock adjusted to the radio frequency module and the base band module to realize the synchronization between the radio frequency module and the base band module.

2. The system according, to claim 1, wherein the time generator comprises: a clock receiving unit, configured to receive the external clock signal, and to send the clock signal to a synchronization generating unit; the synchronization generating unit, configured to generate the synchronous signal according to the clock signal, and to send the synchronous signal to the base band radio frequency interface of the time generator.

3. The system according to claim 1, wherein the time generator further comprises: a protocol terminating unit, configured to set a base band radio frequency interface protocol between the time generator and the time distributor.

4. The system according to claim 1, wherein the time distributor comprises: an arbitrating unit, configured to generate a selecting rule for selecting the synchronous signal from one of the time generators; a generator selecting unit, configured to select the synchronous signal for generating the synchronous clock from the synchronous signals received according to the selecting rule generated by the arbitrating unit; a clock locking unit, configured to obtain the synchronous signal selected by the generator selecting unit, to generate the synchronous clock according to the synchronous signal obtained, and to adjust the synchronous clock according to the communication delay between the time generator which outputs the synchronous signal and the time distributor; and a clock, driving unit, configured to obtain the synchronous clock adjusted by the clock locking unit, and to send the synchronous clock adjusted to the radio frequency module and the base band module.

5. The system according to claim 4, wherein the generator selecting unit comprises: a synchronization quality detecting unit, configured to detect one or more synchronous signals of which the quality meets requirements from the synchronous signals from the time generators; a synchronous signal storing unit, configured to store the one or more synchronous signals detected by the synchronization quality detecting unit.

6. The system according to claim 5, wherein under the circumstance that the current synchronous signal are unusable, the generator selecting unit selects one synchronous signal from the synchronous signal storing unit and send it to the time distributor.

7. The system according to claim 1, wherein the time generator is further configured to measure the communication delay between the time generator and the time distributor and to notify the communication delay between the time generator and the time distributor to the time distributor.

8. The system according to claim 1, wherein the time distributor is further configured to inquire a delay calculator the communication delay between the time generator which outputs the synchronous signal and the time distributor according to a source address of the synchronous signal received.

9. The system according to claim 7, wherein the time generator is an independent network element or a subsidiary network element inside the base band module of the base station.

10. The system according to claim 9, wherein a network topology relationship among the time generators is a star shape, a link shape, a ring shape, or a tree shape.

11. The system according, to claim 10, wherein the time distributor is in a free-vibrating state under the circumstance that the time distributor is just powered on.

12. The system according to claim 8, wherein the time generator is an independent network element or a subsidiary network element inside the base band module of the base station.

13. The system according to claim 12, wherein a network topology relationship of the time generators is a star shape, a link shape, a ring shape, or a tree shape.

14. The system according to claim 13, wherein the time distributor is in a free-vibrating state under the circumstance that the time distributor is just powered on.

15. The system according to claim 2, wherein the time generator is further configured to measure the communication delay between the time generator and the time distributor and to notify the communication delay between the time generator and the time distributor to the time distributor.

16. The system according to claim 3, wherein the time generator is further configured to measure the communication delay between the time generator and the time distributor and to notify the communication delay between the time generator and the time distributor to the time distributor.

17. The system according to claim 4, wherein the time generator is further configured to measure the communication delay between the time generator and the time distributor and to notify the communication delay between the time generator and the time distributor to the time distributor.

18. The system according to claim 2, wherein the time distributor is further configured to inquire a delay calculator the communication delay between the time generator which outputs the synchronous signal and the time distributor according to a source address of the synchronous signal received.

19. The system according to claim 3, wherein the time distributor is further configured to inquire a delay calculator the communication delay between the time generator which outputs the synchronous signal and the time distributor according to a source address of the synchronous signal received.

20. The system according to claim 4, wherein the time distributor is further configured to inquire a delay calculator the communication delay between the time generator which outputs the synchronous signal and the time distributor according to a source address of the synchronous signal received.

* * * * *